(12) United States Patent
Cavalcante

(10) Patent No.: US 10,001,243 B2
(45) Date of Patent: Jun. 19, 2018

(54) FLEXIBLE KICKSTAND AND MOUNTING APPARATUS FOR PORTABLE ELECTRONIC DEVICE

(71) Applicant: Mauricio D. Cavalcante, Spring, TX (US)

(72) Inventor: Mauricio D. Cavalcante, Spring, TX (US)

( * ) Notice: Subject to any disclaimer, the term of this patent is extended or adjusted under 35 U.S.C. 154(b) by 0 days. days.

(21) Appl. No.: 15/595,311

(22) Filed: May 15, 2017

(65) Prior Publication Data

US 2017/0328514 A1    Nov. 16, 2017

Related U.S. Application Data

(60) Provisional application No. 62/336,266, filed on May 13, 2016.

(51) Int. Cl.
| | |
|---|---|
| *F16M 13/02* | (2006.01) |
| *F16M 13/00* | (2006.01) |
| *F16M 13/04* | (2006.01) |
| *A45F 5/00* | (2006.01) |
| *A45C 11/00* | (2006.01) |
| *H04M 1/02* | (2006.01) |

(52) U.S. Cl.
CPC ............. *F16M 13/00* (2013.01); *A45C 11/00* (2013.01); *A45F 5/00* (2013.01); *F16M 13/022* (2013.01); *F16M 13/04* (2013.01); *H04M 1/02* (2013.01); *A45C 2011/002* (2013.01); *A45C 2200/15* (2013.01); *A45F 2005/008* (2013.01); *A45F 2200/0516* (2013.01)

(58) Field of Classification Search
CPC ............. A45C 2011/002; A45C 13/002; A45F 2200/0516

See application file for complete search history.

(56) References Cited

U.S. PATENT DOCUMENTS

| | | | | |
|---|---|---|---|---|
| 7,810,683 | B2 * | 10/2010 | Chan .......................... | A45F 5/00 224/221 |
| 8,567,832 | B2 * | 10/2013 | Kannaka ................... | A45F 5/00 224/218 |

(Continued)

FOREIGN PATENT DOCUMENTS

| | | |
|---|---|---|
| CN | 200980098 | 11/2007 |
| CN | 201127039 | 10/2008 |

(Continued)

OTHER PUBLICATIONS

Loopycases, Loopy iPhone 7—LoopyCases®, Apr. 2016, Website, https://www.loopycases.com/products/loopyiphone7.

(Continued)

*Primary Examiner* — Bradley Duckworth
(74) *Attorney, Agent, or Firm* — Carlson, Gaskey & Olds, P.C.

(57) ABSTRACT

A case assembly for an electronic device includes a case including a back wall and a peripheral wall projecting from a periphery of the back wall to define a case interior. The back wall includes an exterior surface and a plurality of slots formed through the back wall. A flexible member is positioned in the plurality of slots to form a plurality of expandable portions on the exterior surface of the back wall.

18 Claims, 13 Drawing Sheets

(56) References Cited

U.S. PATENT DOCUMENTS

| | | | | |
|---|---|---|---|---|
| 8,939,483 B2* | 1/2015 | Kim | ...................... | H04B 1/385 |
| | | | | 224/217 |
| 9,185,954 B2* | 11/2015 | Cheung | .................. | F16M 11/10 |
| 9,259,077 B2* | 2/2016 | Murphy | .................. | F16M 13/00 |
| 9,300,346 B2* | 3/2016 | Hirsch | .................. | H04B 1/385 |
| 9,407,743 B1* | 8/2016 | Hirshberg | ............... | H04M 1/04 |
| 2004/0094592 A1* | 5/2004 | Brown | .................. | A45C 13/30 |
| | | | | 224/623 |
| 2005/0221762 A1* | 10/2005 | Greene | .................. | A45F 5/021 |
| | | | | 455/66.1 |
| 2011/0252607 A1 | 10/2011 | Rothbaum | | |
| 2011/0294556 A1 | 12/2011 | Carlberg et al. | | |
| 2011/0309117 A1* | 12/2011 | Roberts | ..................... | A45F 5/00 |
| | | | | 224/217 |
| 2012/0063066 A1* | 3/2012 | Floit | ......................... | A45F 3/14 |
| | | | | 361/679.01 |
| 2013/0148271 A1* | 6/2013 | Huang | .................. | H04B 1/3888 |
| | | | | 361/679.01 |
| 2014/0054909 A1* | 2/2014 | Kannaka | ................. | A45F 5/102 |
| | | | | 294/137 |
| 2014/0117820 A1* | 5/2014 | Hung | .................. | H04B 1/3888 |
| | | | | 312/223.1 |
| 2014/0364176 A1 | 12/2014 | Pintor | | |
| 2015/0335138 A1* | 11/2015 | Juarbe | ...................... | A45F 5/00 |
| | | | | 224/218 |
| 2016/0172883 A1* | 6/2016 | Globerson | ............ | H02J 7/0044 |
| | | | | 320/115 |
| 2016/0277551 A1* | 9/2016 | Williams | .................. | A45F 5/00 |
| 2016/0345695 A1* | 12/2016 | Stagge | .................... | A45C 11/00 |
| 2016/0345715 A1* | 12/2016 | Lin | ........................... | A45F 5/00 |
| 2017/0013107 A1* | 1/2017 | Adams | .................... | H04W 4/02 |
| 2017/0208924 A1* | 7/2017 | Wu | ........................ | A45F 3/005 |
| 2017/0230072 A1* | 8/2017 | Kim | ..................... | H04B 1/3888 |
| 2017/0244440 A1* | 8/2017 | Kim | ..................... | H04B 1/3888 |

FOREIGN PATENT DOCUMENTS

| | | |
|---|---|---|
| CN | 201319938 | 10/2009 |
| CN | 201929230 U | 8/2011 |
| CN | 203859568 | 10/2014 |
| CN | 203894671 | 10/2014 |
| CN | 204069075 | 12/2014 |
| FR | 666401 | 12/1928 |
| JP | 2013046726 | 3/2013 |
| KR | 1020060119605 | 11/2006 |

OTHER PUBLICATIONS

Scooch Case, Scooch Case | The Most Functional Phone Case on the Market, Apr. 2016, Website, http://scoochcase.com/products/.

* cited by examiner

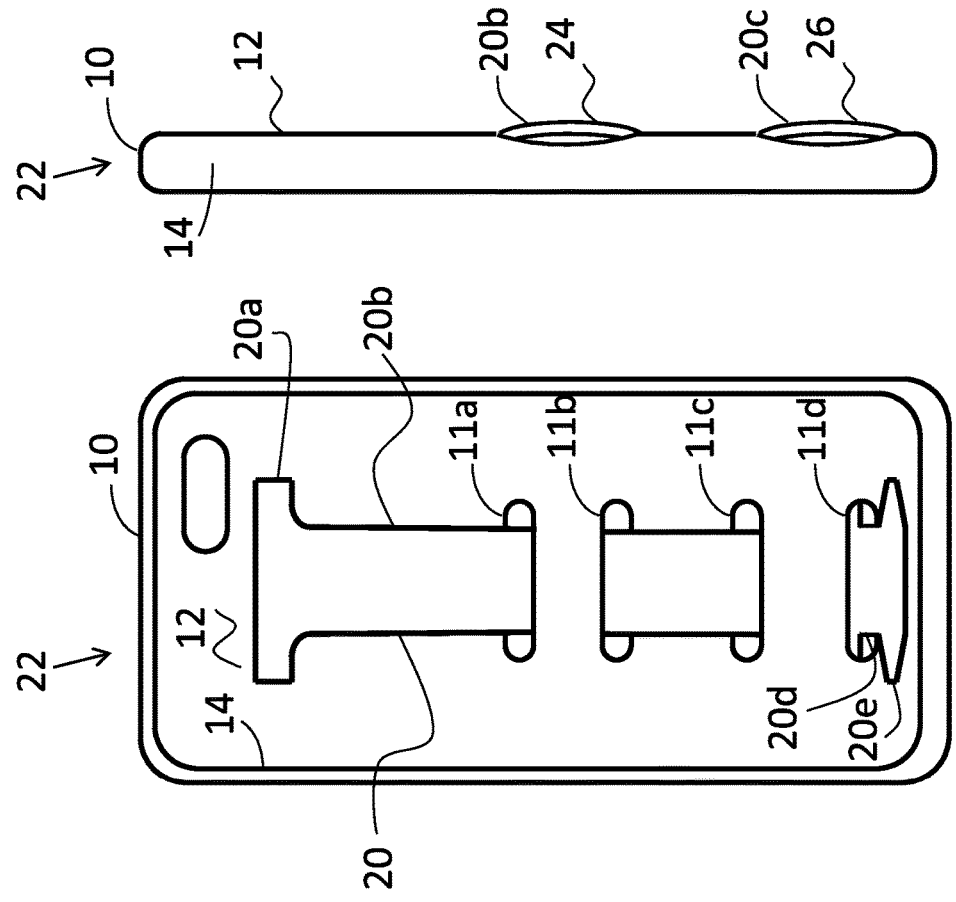
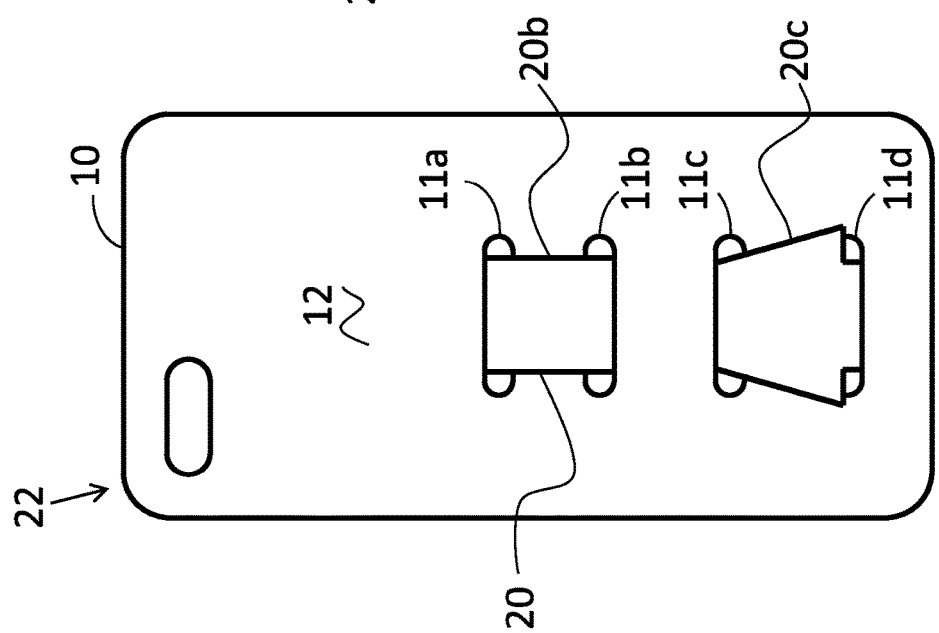
Figure 3C
Figure 3B
Figure 3A

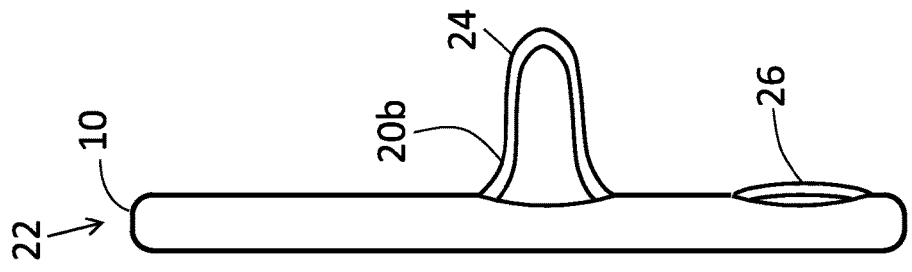
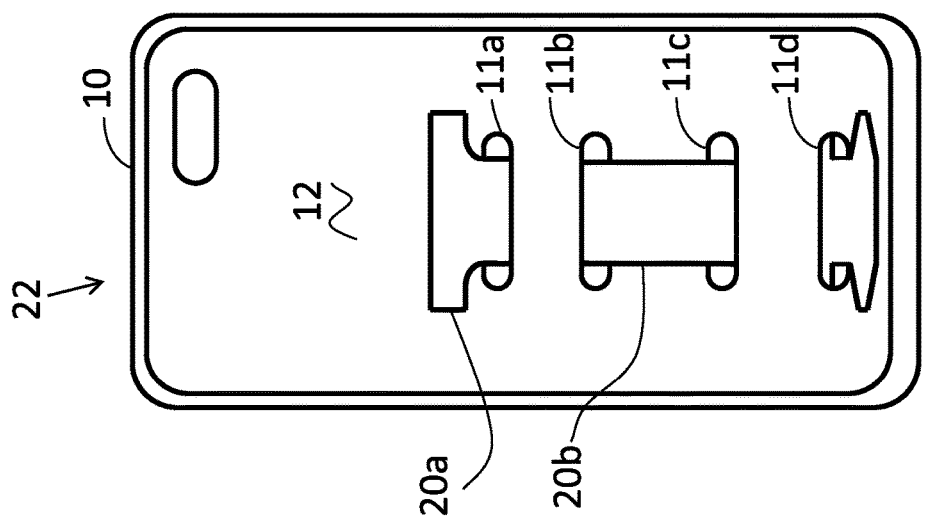
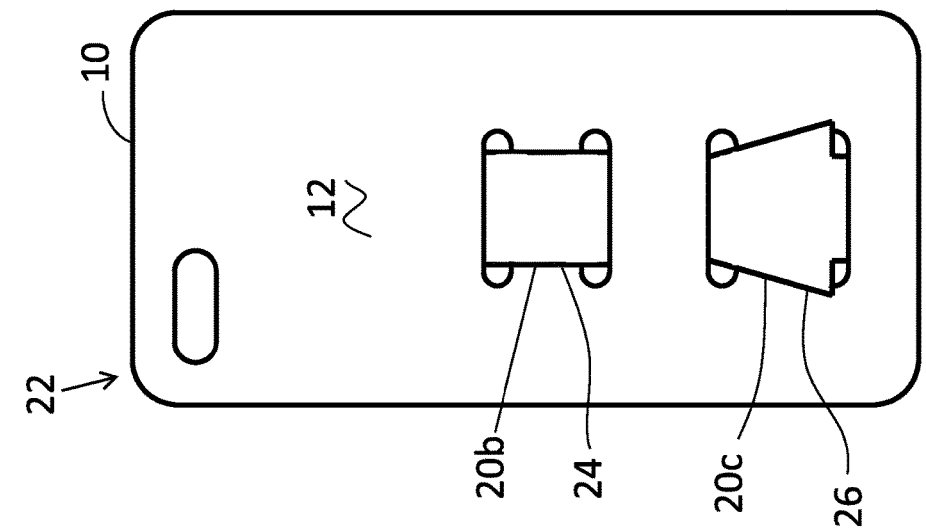

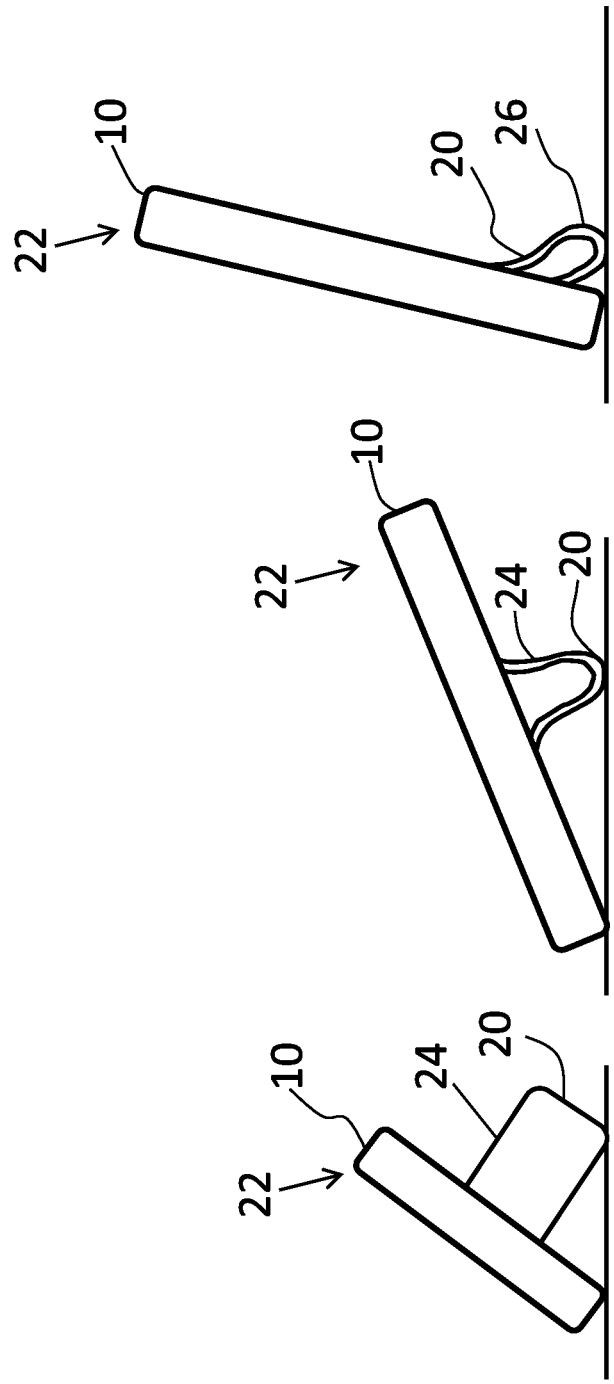

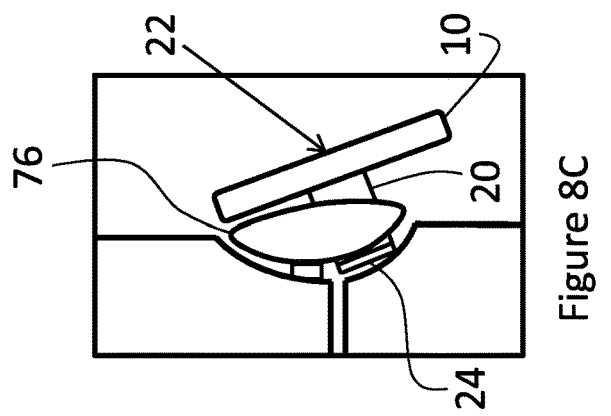
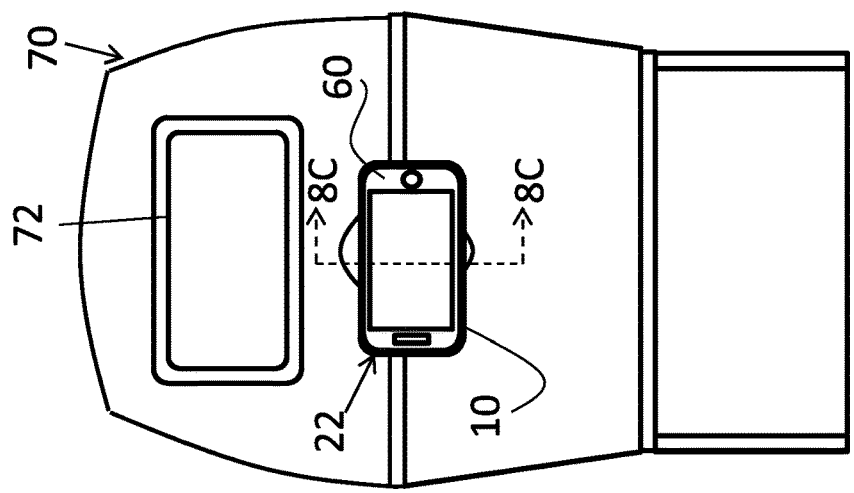
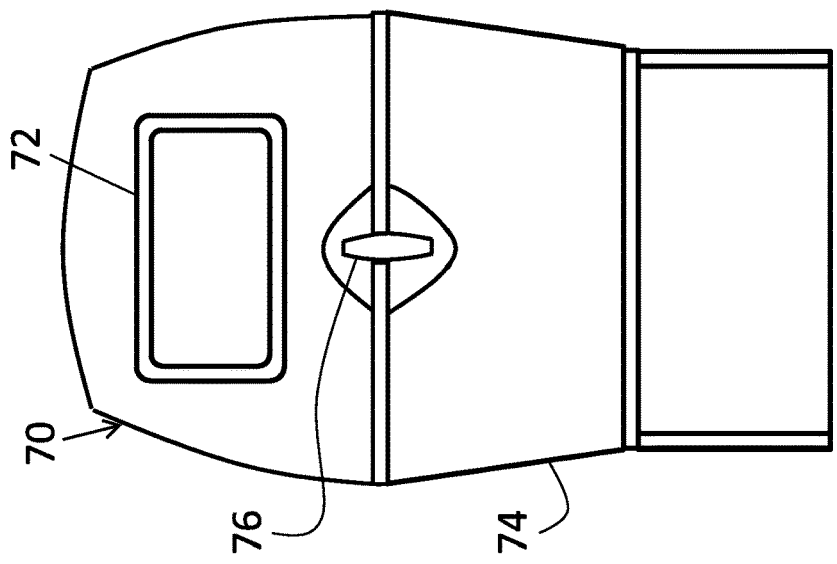

FLEXIBLE KICKSTAND AND MOUNTING APPARATUS FOR PORTABLE ELECTRONIC DEVICE

BACKGROUND OF THE INVENTION

The invention relates to accessories to portable electronic devices. In particular accessories such as protective cases with built in kickstands and or mounting apparatus.

Portable electronic devices or hand-held devices have become extremely popular. Most people interact with their phone all day. And when they go to bed at night their phones remain by their side. That means that there are multiple settings and multiple positions where the user may interact with the phone.

Many portable electronic device users elect to protect their device with a protective case. It is normally advantageous for this case to have a slim profile because the user will most likely carry it on their person. Therefore the phone must fit inside a person's pocket or inside a purse or carrying bag.

One common use of a smart portable device is when sitting at a table. For the user to properly view the screen he/she has to either pick the phone with one hand and angle it, or lay down the phone flat on the surface of the table and angle their neck and head down to properly view the screen. Picking up the phone with one hand renders that hand useless for the time while you are interacting with the phone. This can be detrimental if you are performing other tasks concurrently. Placing the phone flat on the table does not provide a proper viewing angle for the user, and if the user is calling someone else on an video chat application and the phone lying flat on a table the camera would be pointing straight up which is not very convenient. There is clearly a need for a kickstand solution to be used in the table top application.

Another common use is in a vehicle. Users constantly use the GPS feature on the phone to give them turn by turn directions to whichever destination they have chosen. This extremely important when travelling to areas where the user is not familiar In addition new applications give real time traffic updates, so it makes it advantageous for daily commuters to monitor traffic through an application like Waze. However it can be very dangerous to try to drive and pay attention to traffic while holding the phone in your hand and looking down, or lay the phone flat on the middle console and looking down to see the phone. There is a need for a portable device mounting solution inside a vehicle so the user can drive with both hands while viewing the phone (without looking down) displaying driving directions.

Yet another application is inside an airplane. Most travelers have their portable electronic devices with them inside an airplane. Since most economy seats have a tray table available for each traveler, it can be advantageous to place your phone on top of the tray table while interacting with your phone. This application is very similar to the table top application described above. However looking down for an extended period of time can be uncomfortable and not very convenient, especially if the user is trying to watch a movie on their phone during a flight. Alternative phone mounting options are clearly needed.

Portable electronic device users often interact with their phone while walking. Since phones have very smooth edges and smooth surfaces, getting a grip on a phone during any type of dynamic application where movement is involved can be difficult. There is a need for a finger hold to provide a secure grip while holding a phone.

Users take their phone everywhere, this includes restaurants and bars. Again while sitting the user has the table top application to use, however there is an additional application that can be advantageous. If there is a bottle or a can sitting on the table, in order to gain some height while interfacing with the phone the user could mount the phone to the can or bottle. This would be advantageous when chatting on a video application.

Edge mounting is another possible application. Edge mounting is when a user is working on a laptop and while sitting on a couch. If there are no hard surfaces around where he/she can place their phone it can be advantageous to mount their phone to the top horizontal edge of the laptop screen. This allows the user to interface with the laptop and phone concurrently.

In the market today there are many kickstand solutions and there are many mounting solutions, however there is no single solution that addresses all the applications named above. The disclosed exemplary protective case provides the single solution. Anywhere there is a flat surface, an edge or a slot, the protective case disclosed below provides an opportunity to mount phone. Hand held devices are great, but sometimes it is better and safer if the device is hands-free.

SUMMARY OF THE INVENTION

An example protective case for a portable electronic device has through slot holes formed onto its flat surface. This flat surface of the protective case when fitted to a portable electronic device gets fitted adjacently to the back of the portable electronic device (opposite of the viewing screen). There is a second component which is flexible that is interlaced through the slot holes of the protective case. The flexible component when properly interlaced with the protective case which is fitted to a portable device, will make contact simultaneously with back of the phone and the protective case. The flexible component is interlaced so that two sections (middle and bottom) are exposed to the outside or exterior portion of the protective case. Both the protective case and flexible component are manufactured out of a flexible material such as plastic. The flexible component has three positions: retracted, deployed middle and deployed bottom. In the retracted position (or home position) the protective case is slim and the flexible component is secure. In this position the phone and protective case fit easily inside a person's pocket. To deploy the middle position the user pulls on the flexible component outwardly (at the middle exposed section) to flex the component into the middle deployed position. The middle deployed position forms and arch which is rigid across its width but flexible across its length. This middle position creates a kick stand for table top applications, the car mount application, the airplane tray table lock application, the can and bottle mount, laptop edge mount, and finger hold application. To return the flexible component to the retracted position the user pushes the flexible component slightly inward and the flex component slides back into the slot and returns to its home position. To deploy the flex component to the bottom deployed position the user pulls on the flex component (at the bottom exposed section) to flex the component into the bottom deployed position. The bottom deployed position forms an open tear drop shape. This tear drop shape is created because the bottom edge of the flexible component is anchored. So when the user pulls the flex component from retracted position to bottom deployed position the material extends outwardly to the point where it pivots about the anchored point. The bottom deployed position is used for the table top portrait application which is critical for chatting on video application hands free. To return the flexible component to the retracted position the user pushes the flexible component slightly inward and the flexible component slides back into the slot and returns to its home position.

These and other features of the present invention can be best understood from the following specification and drawings, the following of which is a brief description.

BRIEF DESCRIPTION OF THE DRAWINGS

FIG. 3A is a rear view of a case assembly including the protective case of FIG. 1A interlaced with flexible component of FIG. 2, with the flexible component in the retracted position.
FIG. 3B is a front (interior) view of the case assembly of FIG. 3A.
FIG. 3C is a side view of the case assembly of FIG. 3A.
FIG. 4A is a rear view of the case assembly of FIG. 3A with the flexible component in the middle deployed position.
FIG. 4B is a front view of the case assembly of FIG. 4A.
FIG. 4C is a side view of the case assembly of FIG. 4A.
FIG. 6A is a side view of the case assembly in the middle position on a table top in a side kickstand position.
FIG. 6B is a side view of the case assembly in the middle position on a table top in an angled kickstand position.
FIG. 6C is a side view of the case assembly in the bottom deployed position on a table top in an upright kickstand position.
FIG. 8A illustrates the back of a typical airplane passenger seat.
FIG. 8B illustrates the case assembly of FIG. 4A secured to the airplane passenger seat, with a device received in the case assembly.
FIG. 8C is a section view taken along line 8C-8C of FIG. 8B.

DETAILED DESCRIPTION OF THE PREFERRED EMBODIMENT

Figure 1C:
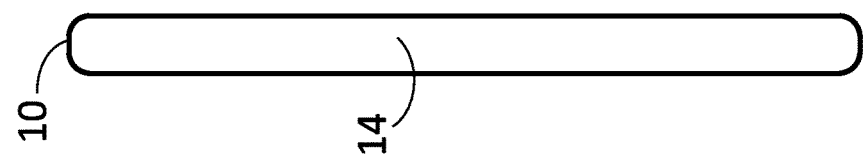
FIG. 1C is a side view of the case of FIG. 1A.
Figure 1B:
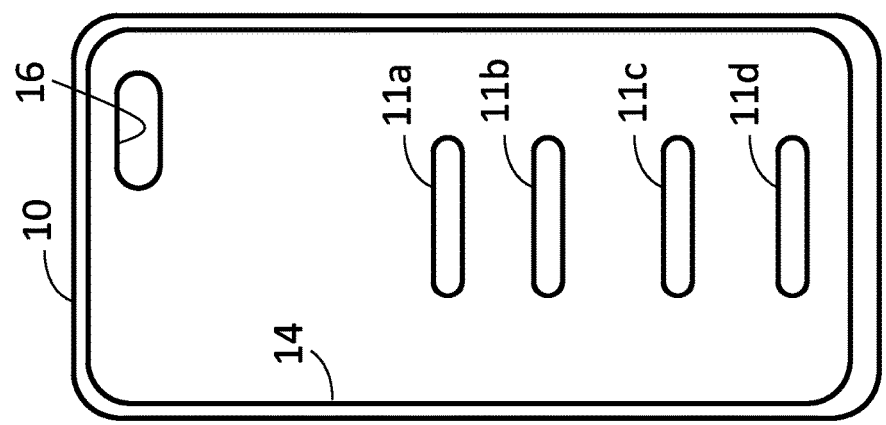
FIG. 1B is a front view of the case of FIG. 1A.
Figure 1A:
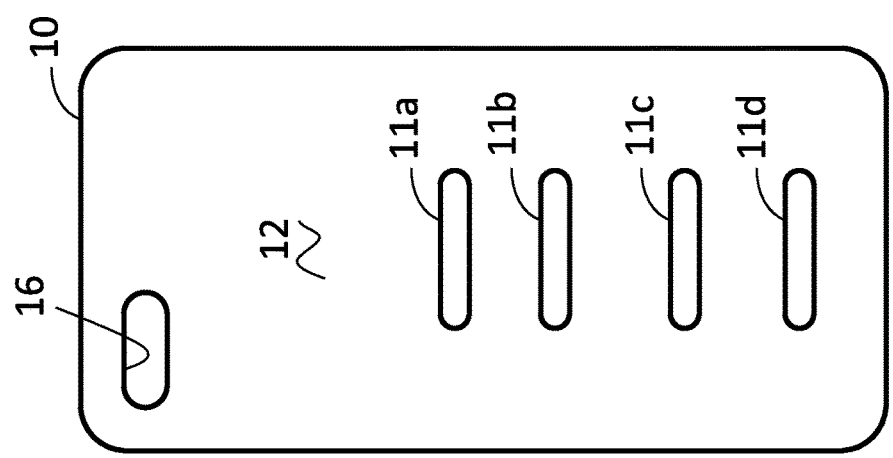
FIG. 1A is a rear view of a protective case.

FIGS. 1A-C illustrate a protective case 10 having a back wall 12 with a plurality of horizontal slots 11a, 11b, 11c, 11d formed therethrough. A peripheral wall 14 extends from the back wall 12 and defines a case interior. The back wall 12 may also include other openings, such as a camera opening 16. Other than the horizontal slots 11a-d, the protective case 10 may be similar to those that are well-known for protecting smart phones and may be molded or otherwise formed as a single piece of plastic, silicone, leather, wood, metal or other suitable material.

The slots 11a-d may be parallel to one another as shown, but could also be at small angles relative to one another. Slot 11a is substantially centered vertically on the back wall 12, but slightly upward of center. Slot 11b is below a vertical center of the back wall 12. Slot 11c is spaced below slot 11b. Slot 11d is spaced below slot 11c and proximate a bottom portion of the peripheral wall 14. The slots 11a-d could be positioned otherwise than as shown, but the illustrated positions are preferred.

Figure 2:
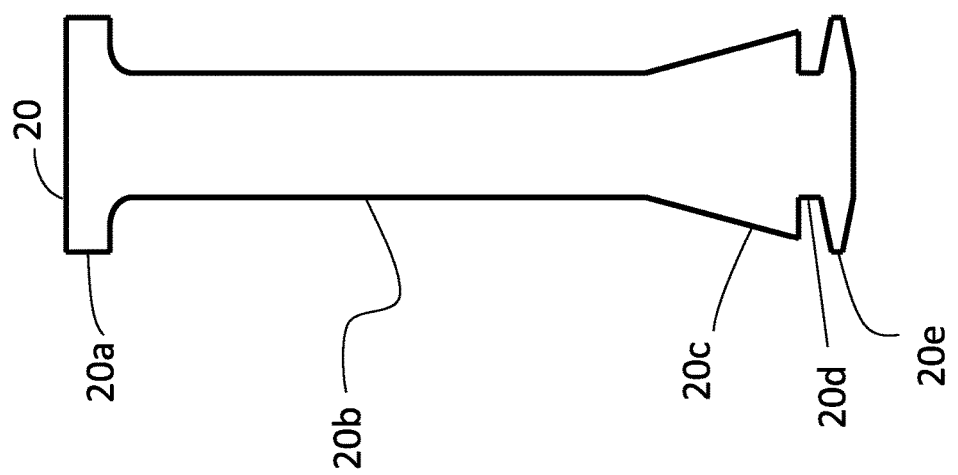
FIG. 2 illustrates front view of the flexible component.

FIG. 2 illustrates a flexible member 20. The flexible member 20 is generally flat (in the plane of the Figure) and includes a top tee portion 20a, an elongated connector portion 20b, an angled locking portion 20c of increasing width, a notch portion 20d and a bottom tee portion 20e. The flexible member 20 can be formed of any flexible material such as plastic.

FIGS. 3A-C illustrate a case assembly 22 including the protective case 10 of FIG. 1A and the flexible member 20 of FIG. 2. The flexible member 20 is interlaced through the horizontal slots 11a-d of the protective case 10. In FIGS. 3A-C, the flexible member 20 is shown in the retracted position. The top tee portion 20a is within the interior of the protective case 10 (i.e. adjacent the front surface). Referring to FIG. 3B, much of the connector portion 20b is also adjacent the front surface of the protective case 10, but is then threaded out (toward the exterior of the protective case 10) through horizontal slot 11a, then back in through horizontal slot 11b, then out through horizontal slot 11c. As shown in FIG. 3A, the locking portion 20c of the flexible member 20 is on the exterior of the protective case 10 between slot 11c and slot 11d. The bottom tee portion 20e is within the interior of the protective case 10, with the notch portion 20d positioned in the slot 11d. The side view of FIG. 3C shows the external exposed sections of the flexible component 20, namely, mid-portion 24 is between slot 11a and slot 11b, and lower portion 26 is between slot 11c and slot 11d. Mid-portion 24 and lower portion 26 have a slight rounded shape which is helpful for the user to be able to pull the mid-portion 24 and/or lower portion 26 into a deployed position, as will be explained below.

As an alternative, the slots 11a-d could be vertical instead of horizontal. The top two vertical slots would be parallel to one another and adjacent one another. The bottom two vertical slots would be parallel to one another and adjacent one another but below the top two slots. A first flexible member could be threaded through the top two slots and movable between a retracted position (mostly inside the case 10) and a deployed position (projecting outward of the case 10). A second flexible member could be threaded through the bottom two slots and movable between a retracted position (mostly inside the case 10) and a deployed position (projecting outward of the case 10).

FIGS. 4A-C shows the case assembly 22 with the flexible member 20 in its middle deployed position. Referring to FIG. 4C, the user has pulled the mid-portion 24 outward of the exterior of the case 10 such that the mid-portion 24 of the flexible member 20 is expanded and protrudes outward from a rear mid-portion of the case 10. Referring to FIG. 4B, the top tee portion 20a has translated downward towards slot 11a. In the middle deployed position, the lower portion 26 remains in place.

Figure 5C:
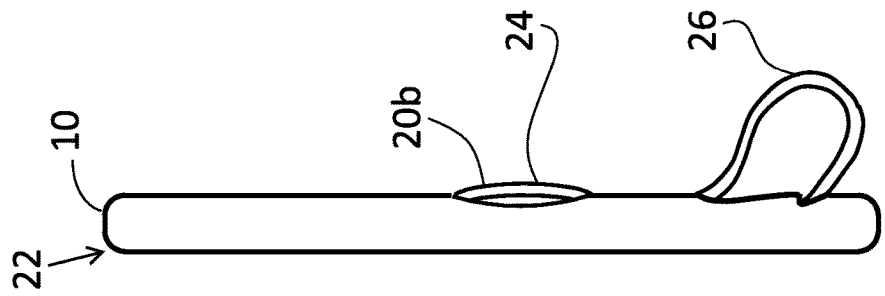
FIG. 5C is a side view of the case assembly of FIG. 5A.
Figure 5B:
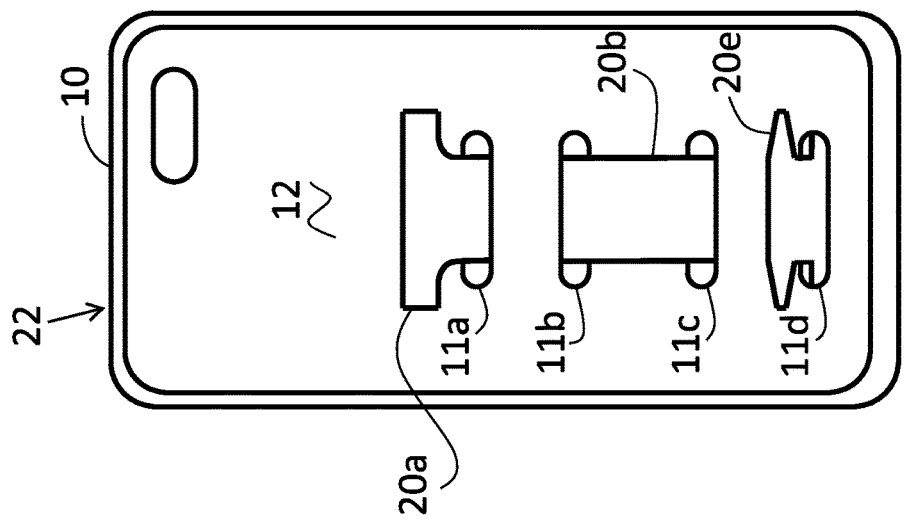
FIG. 5B is a front view of the case assembly of FIG. 5A.
Figure 5A:
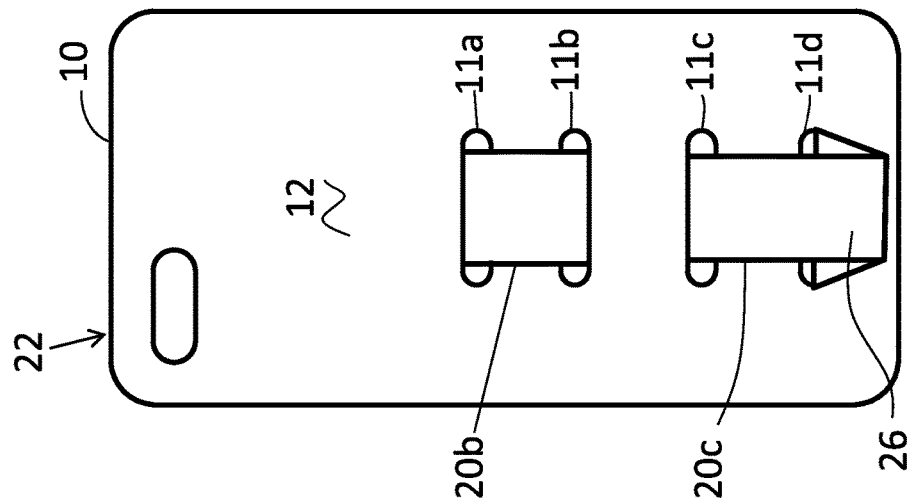
FIG. 5A is a rear view of the case assembly of FIG. 4A with the flexible component in the bottom deployed position.

FIGS. 5A-C illustrate the case assembly 22 with the flexible component 20 in its bottom deployed position. Referring to FIG. 5C, the lower portion 26 has been pulled outward of the exterior of the case 10 by the user such that the lower portion 26 of the flexible member 20 has expanded and protrudes outward from a rear lower portion of the case 10. Referring to FIG. 5B, the locking portion 20c, notch portion 20d and bottom tee portion 20d lock the bottom of the flexible member 20, allowing it to rotate about an axis parallel to the slot 11d but not translate. The top tee portion 20a of the flexible member 20 has translated down to slot 11a, but the top tee portion 20a limits the translation of the flexible member 20 and prevents unintentional removal through the slot 11a. Referring to FIG. 5C, the mid-portion 24 is in a retracted position and the lower portion 26 is in the bottom deployed position. The bottom deployed position forms an open tear drop shape; this is a result of the user pulling the lower portion 26 of the flexible member 20.

FIGS. 6A-C show three ways that the case assembly 22 can be propped on a flat surface such as a table top or desk top. In FIG. 6A, the case assembly 22 is in the middle deployed position, with the mid-portion 24 of the flexible member 20 protruding rearward of the case 10. The case assembly 22 is angled horizontally on the surface, i.e. propped on a long edge of the case 10 that is parallel to the flexible member 20 and on the mid-portion 24 of the flexible member 20, such that the case 10 is angled backward toward the mid-portion 24. This can be considered a "side kickstand position." The user can view a device in the case assembly 22 in this position.

In FIG. 6B, the case assembly 22 is in the middle deployed position, with the mid-portion 24 of the flexible member 20 protruding rearward of the case 10. The case assembly 22 is angled vertically on the surface, i.e. propped on a short edge of the case 10 that is perpendicular to the flexible member 20 and on the mid-portion 24 of the flexible member 20, such that the case 10 is angled backward toward the mid-portion 24. This can be considered an "angled kickstand position." The user can view a device in the case assembly 22 in this position.

In FIG. 6C, the case assembly 22 is in the bottom deployed position with the lower portion 26 of the flexible member 20 protruding rearward of the case 10. The case assembly is arranged vertically on the surface, i.e. propped on a short edge of the case and on the deployed lower portion 26 of the flexible member 20. This can be considered the "upright kickstand position." The user can view a device in the case assembly 22 in this position.

Figure 7B:
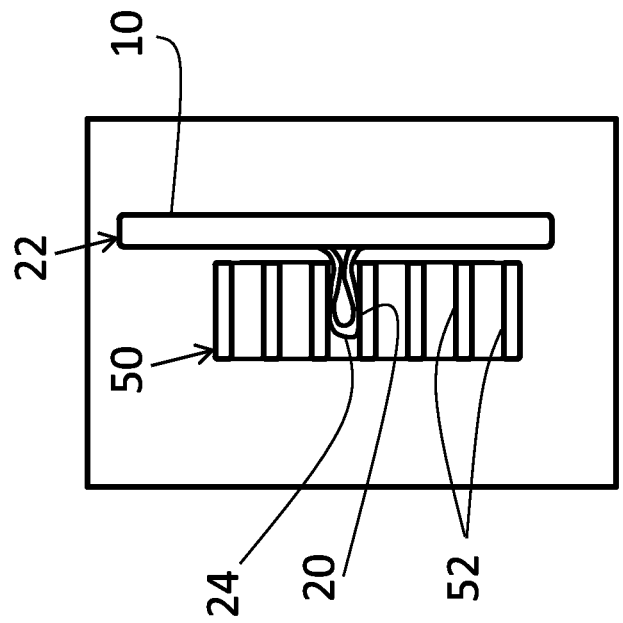
FIG. 7B is a section view taken along line 7B-7B of FIG. 7A.
Figure 7A:
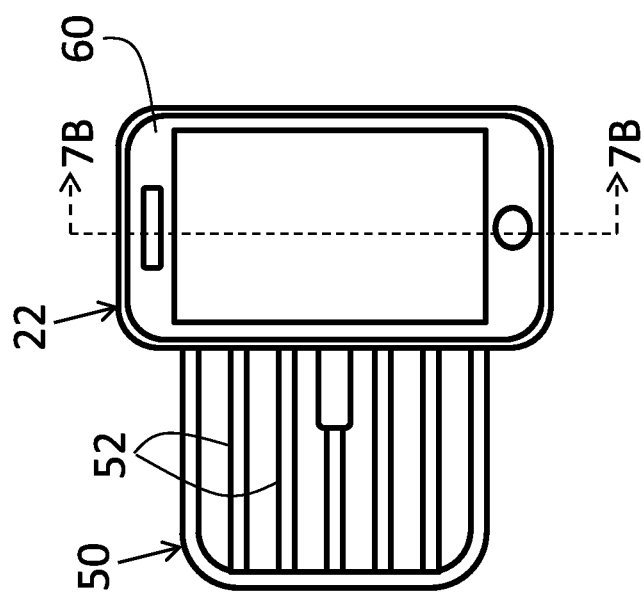
FIG. 7A is a front view of the case assembly of FIG. 4A installed in a car vent and with a device received in the case assembly.

FIGS. 7A-7B show the case assembly 22 mounted to a typical car vent 50 having a plurality of fins 52 (shown as horizontal fins, but would work similarly with vertical fins). The electronic device 60 (here, a smartphone) is also shown in the case assembly 22, but of course would be in the case assembly 22 in FIGS. 6A-D as well. Referring to FIG. 7B, the deployed mid-portion 24 of the flexible member 20 can be inserted between the fins 52, such as by first squeezing the mid-portion 24 together, inserting it, and letting the mid-portion 24 expand between the fins 52, thereby securing the case assembly 22 (and device 60) to the vent 50.

FIGS. 8A-C show the use of the case assembly 22 on a typical airplane seat back 70. An airplane seat back 70 may include a display 72 mounted above a tray table 74. The tray table 74 is pivotably mounted at its lower end and secured at its upper end by a rotatable latch 76. Referring to FIG. 8C, the mid-portion 24 of the flexible member 20 can be looped under the latch 76 to secure the case assembly 22 and device 60 to the seat back 70 at the upper edge of the tray table 74. The user can watch a video on device 60 in this position.

Figure 9D:
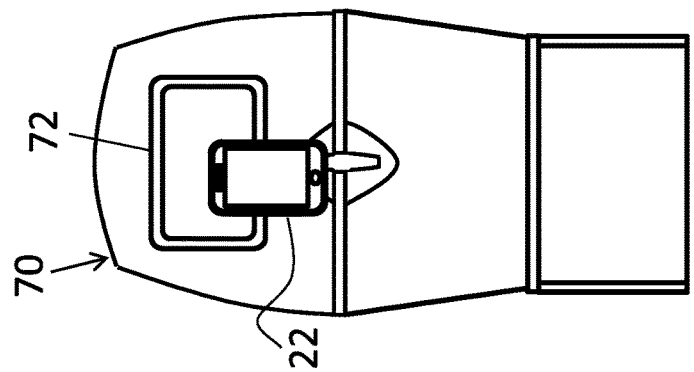
FIGS. 9A-D illustrate alternate mounting locations of the case assembly to the airplane seat back.
Figure 9C:
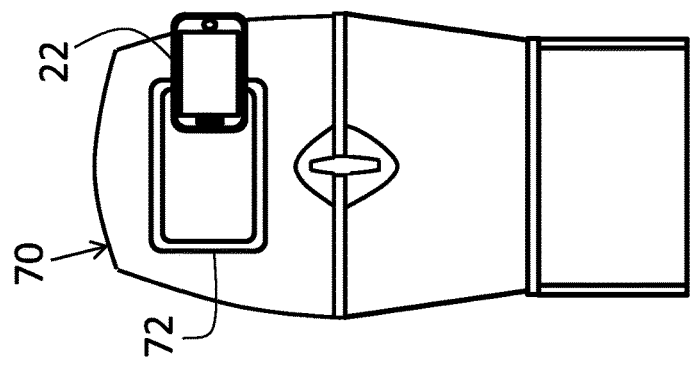
Figure 9B:
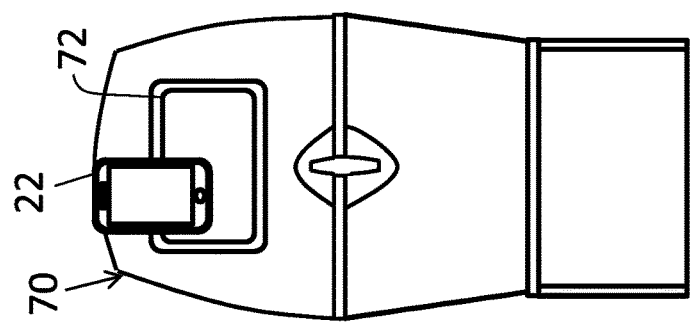
Figure 9A:
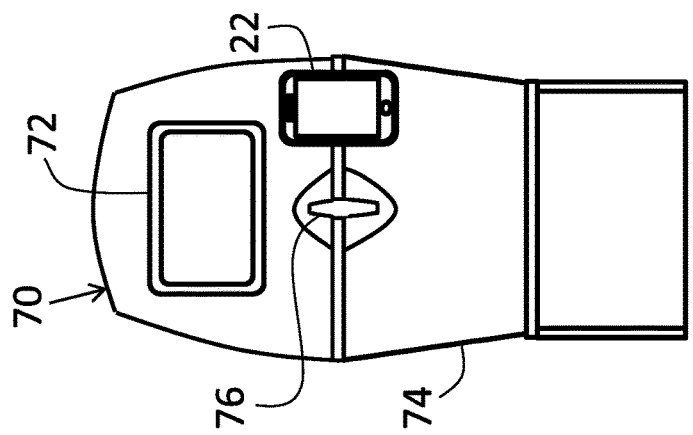

FIGS. 9A-D show that the case assembly 22 can also be mounted to various gaps in the seat back 70, such as the gap at the upper edge of the tray table 74 (FIG. 9A) or any of the gaps around the periphery of the display 72 in the seat back 70 (FIGS. 9B-D). Different gaps can provide different orientations of the case assembly 22 and therefore of the device 60, as shown.

Figure 10B:
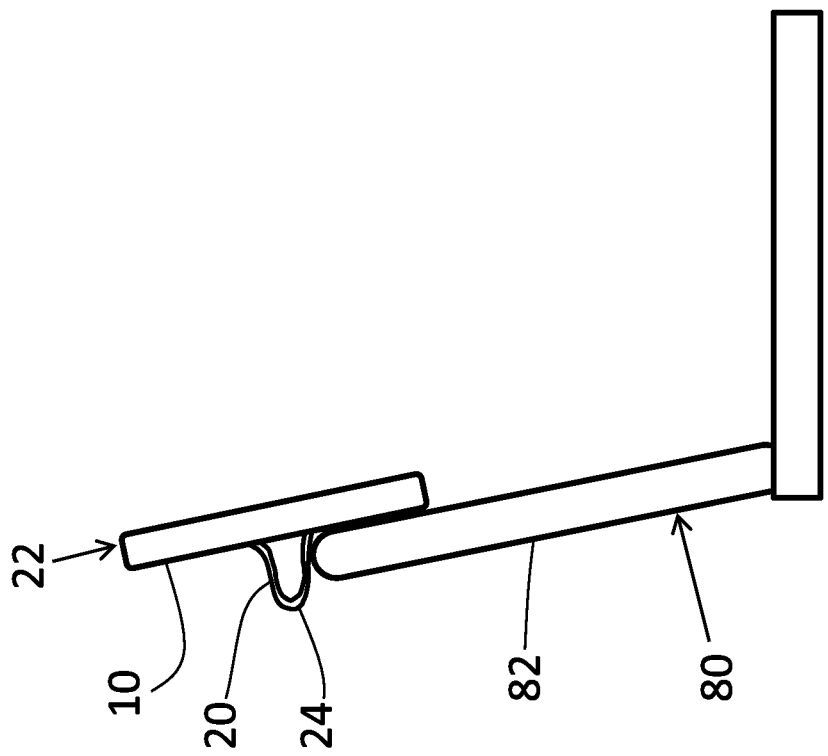
FIG. 10B is a side view of the case assembly and computer of FIG. 10A, with a device received in the case assembly.
Figure 10A:
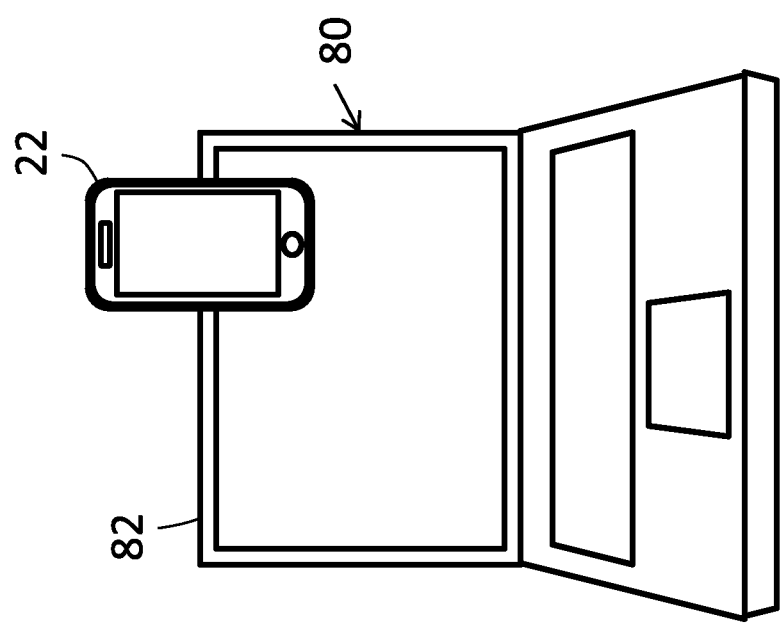
FIG. 10A illustrates the case assembly mounted to a laptop computer.

FIGS. 10A-B show the deployed mid-portion 24 of the flexible member 20 securing the case assembly 22 on an upper edge of an object, such as a display 82 of a computer 80 (such as a laptop computer). Referring to FIG. 10B, the deployed mid-portion 24 is positioned on the upper edge of the display 82. The case assembly 22 and device 60 are held at the upper edge of the display 82 by the mid-portion 24 of the flexible member 20, aided by the fact that the display 82 is tilted rearwardly at least slightly.

Figure 11C:
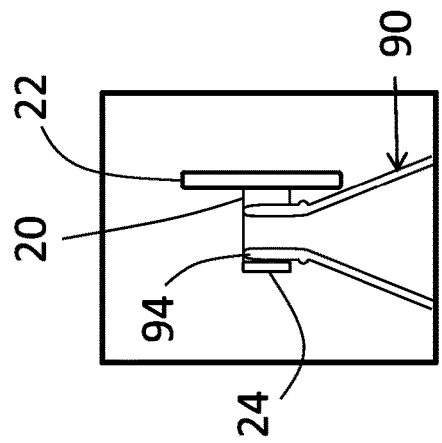
FIG. 11C is a section view taken along line 11C-11C of FIG. 11B.
Figure 11B:
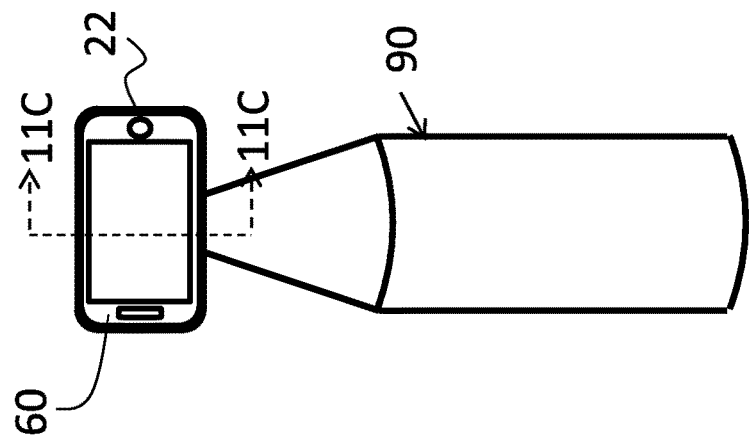
FIG. 11B shows the case assembly of FIG. 4A secured to the beverage bottle of FIG. 11A.
Figure 11A:
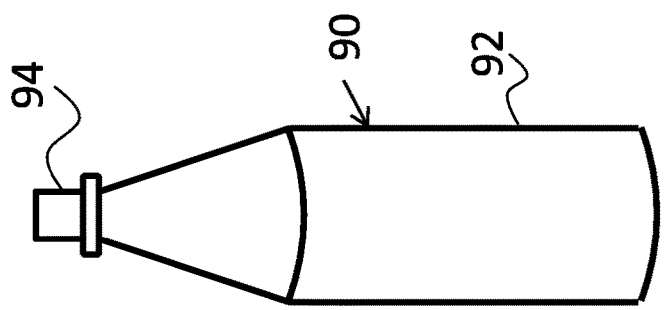
FIG. 11A illustrates a beverage bottle.

FIGS. 11A-C show the case assembly 22 secured to the neck 94 of a bottle 90 (such as a beverage bottle). The bottle 90 has a body portion 92 and a neck 94. The mid-portion 24 of the flexible member 20 can be looped around the neck 94 to retain the case assembly 22 at the top of the bottle 90. The top of the bottle 90 may be a more convenient height for the user to view the device 60.

Figure 12:
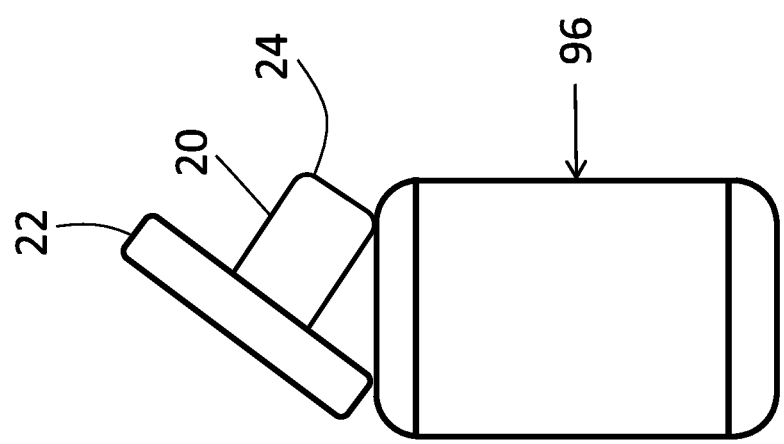
FIG. 12 is a side view of the case assembly supported on top of a beverage can.

As shown in FIG. 12, the case assembly 22 can also be propped on a can 96 (such as a beverage can 96). The case assembly 22 is in the side kickstand position of FIG. 6A. The device 60 is received in the case assembly, but not visible.

Figure 13:
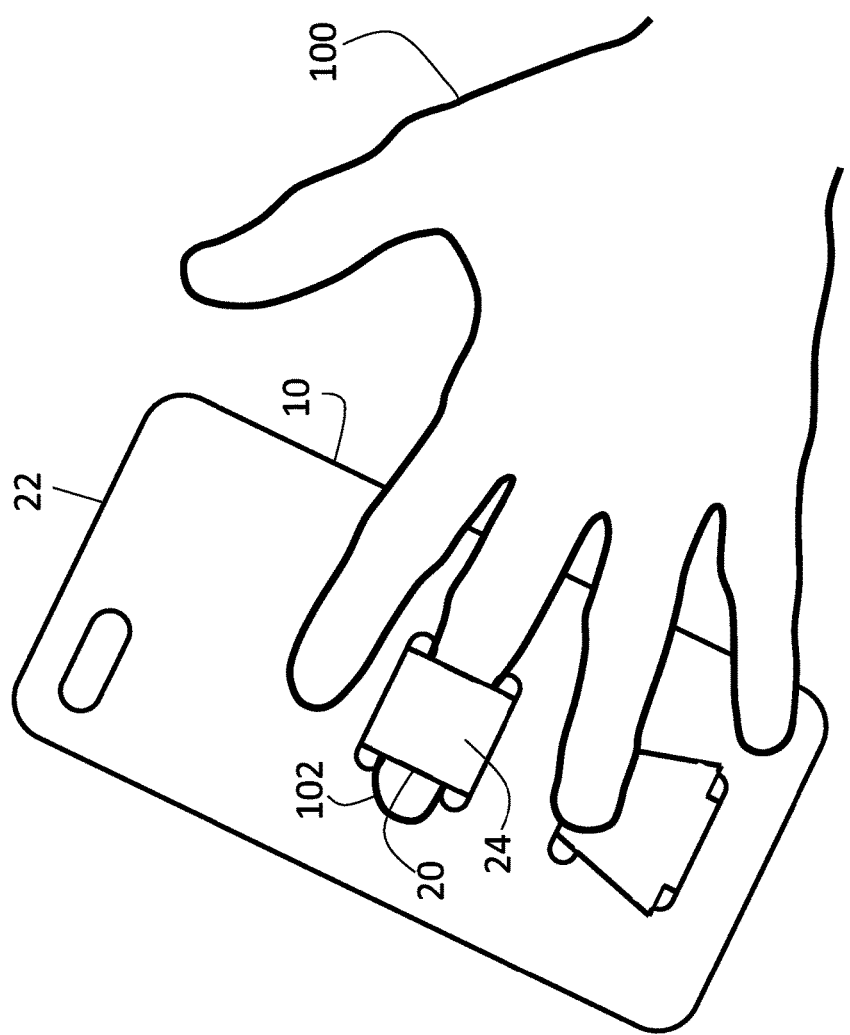
FIG. 13 shows the case assembly of FIG. 4A secured to a finger of a user's hand.

As shown in FIG. 13, the mid-portion 24 of the flexible member 20 can also be used to loop around the finger 102 of a user's hand 100. This can provide the user with a more secure grip on their device 60 (FIG. 11B) to reduce the likelihood of the user dropping the device 60. The device 60 is received in the case assembly, but not visible.

There are many other potential uses of the case assembly 22 and other ways that users can find to mount the case assembly 22 and device 60 in various positions to various objects for their convenient use and viewing of the device.

In accordance with the provisions of the patent statutes and jurisprudence, exemplary configurations described above are considered to represent preferred embodiments of the invention. However, it should be noted that the invention can be practiced otherwise than as specifically illustrated and described without departing from its spirit or scope.

What is claimed is:

1. A case assembly for an electronic device comprising:
   a case including a back wall and a peripheral wall projecting from a periphery of the back wall to define a case interior configured to receive an electronic device, the back wall including an exterior surface and a plurality of slots formed through the back wall, wherein the plurality of slots includes a first pair of slots and a second pair of slots; and
   a generally flat flexible member, wherein the flexible member is positioned in the plurality of slots to form a plurality of expandable portions on the exterior surface of the back wall, wherein the flexible member is elongated and has a constant length defined between opposite ends, wherein the opposite ends are within the case interior, wherein one of opposite ends of the flexible member is configured to translate within the interior of the case as the mid-portion of the flexible member is expanded and retracted.

2. The case assembly of claim 1 wherein the flexible member is movable to a flat configuration generally parallel to the back wall with the opposite ends of the flexible member furthest apart from one another, and wherein the flexible member has a longest dimension along its length and has a width perpendicular to its length, the flexible member having a thickness less than the width, each of the plurality of slots having a width larger than its height, wherein the flexible member includes at least one enlarged portion of increased width, the enlarged portion configured to prevent at least one of the opposite ends of the flexible member from being removed from the case interior, wherein the increased width of the enlarged portion is larger than the width of one of the plurality of slots to prevent removal of the flexible member from the back wall of the case.

3. The case assembly of claim 1 wherein the first pair of slots is separated by a first portion of the back wall and the second pair of slots is separated by a second portion of the back wall, the first pair of slots separated from the second pair of slots by a third portion of the back wall, wherein the back wall includes a pair of opposed, generally parallel first edges wherein the first pair of slots and the second pair of slots are generally parallel to the first edges, wherein the flexible member is threaded through the first pair of slots and the second pair of slots to create an expandable mid-portion of the flexible member exterior of the first portion of the back wall and an expandable lower portion of the flexible member exterior of the second portion of the back wall, wherein the flexible member abuts an interior surface of the third portion of the back wall.

4. The case assembly of claim 3 wherein the mid-portion is proximate a mid-portion of the case and wherein the lower portion is proximate a lower edge of the case.

5. The case assembly of claim 4 wherein the opposite ends of the flexible member are each secured within the interior of the case.

6. The case assembly of claim 4 mounted in a car, wherein the mid-portion of the flexible member is received between the fins of a car vent of the car.

7. The case assembly of claim 4 mounted in an airplane seat back, wherein the mid-portion of the flexible member is secured to a tray table latch of the airplane seat back.

8. The case assembly of claim 4 mounted to a bottle, wherein the mid-portion of the flexible member is secured around a neck of the bottle.

9. The case assembly of claim 4 wherein the case is configured to receive a smartphone.

10. The case assembly of claim 1 wherein the case is configured to receive a smartphone.

11. The case assembly of claim 10 and a smart phone received in the case.

12. The case assembly of claim 11 wherein one of the plurality of slots has a width greater than its height and wherein the flexible member is flat and includes at least one enlarged portion for preventing at least one of the opposite ends of the flexible member from being removed from the case, wherein the enlarged portion is larger than the width of the one of the plurality of slots.

13. The case assembly of claim 12 wherein the first pair of slots is separated by a first portion of the back wall and the second pair of slots is separated by a second portion of the back wall, the first pair of slots separated from the second pair of slots by a third portion of the back wall, wherein the flexible member is threaded through the first pair of slots and the second pair of slots to create an expandable mid-portion of the flexible member exterior of the first portion of the back wall and an expandable lower portion of the flexible member exterior of the second portion of the back wall.

14. A case assembly for an electronic device comprising:
a case including a back wall and a peripheral wall projecting from a periphery of the back wall to define a case interior, the back wall including an exterior surface and a plurality of slots formed through the back wall, the plurality of slots including a first pair of adjacent slots separated by a first portion of the back wall and a second pair of adjacent slots separated by a second portion of the back wall, the first pair of adjacent slots separated from the second pair of adjacent slots by a third portion of the back wall; and
at least one flexible member threaded through the first pair of slots and the second pair of slots to create an expandable mid-portion of the at least one flexible member exterior of the first portion of the back wall and an expandable lower portion of the at least one flexible member exterior of the second portion of the back wall, wherein the flexible member is adjacent an interior surface of the third portion of the back wall.

15. The case assembly of claim 14 wherein the case is configured to receive a smartphone.

16. The case assembly of claim 14 further including a smart phone received in the case.

17. The case assembly of claim 14 wherein the at least one flexible member includes a first flexible member having opposite ends, wherein at least one of the opposite ends is configured to translate within the interior of the case as the mid-portion of the first flexible member is expanded.

18. A case assembly for an electronic device comprising:
a case including a back wall and at least one peripheral wall projecting from a periphery of the back wall to define a case interior, the back wall including an exterior surface and a plurality of slots formed through the back wall, each of the plurality of slots having a width greater than its height; and
a flexible member positioned in the plurality of slots to form a plurality of expandable portions on the exterior surface of the back wall, wherein the flexible member is elongated and has a fixed length defined between opposite free ends within the case interior, wherein the flexible member is reconfigurable between a retracted position in which the flexible member is substantially flat and substantially parallel to the back wall, a deployed middle position in which a middle portion of the flexible member is expanded exterior of the case and a deployed bottom position in which a bottom portion of flexible member is expanded exterior of the case, wherein the flexible member has an enlarged portion within the case interior, wherein the enlarged portion is larger than the width of one of the plurality of slots and is configured to prevent removal of the enlarged portion of the flexible member through the one of the plurality of slots.

* * * * *